(12) United States Patent
Chen et al.

(10) Patent No.: US 11,897,073 B2
(45) Date of Patent: Feb. 13, 2024

(54) DOUBLE-STATION GANTRY COMBINED PROCESSING SYSTEM FOR AUTOMATICALLY OVERTURNING AND PROCESSING WORKPIECES

(71) Applicant: KEDE NUMERICAL CONTROL CO., LTD., Liaoning (CN)

(72) Inventors: Hu Chen, Liaoning (CN); Changlin Du, Liaoning (CN); Rui Tang, Liaoning (CN); Chungang Cai, Liaoning (CN); Cuijuan Guo, Liaoning (CN); Shuqiang Yin, Liaoning (CN); Ang Li, Liaoning (CN); Xinglin Gong, Liaoning (CN); Feng Wang, Liaoning (CN); Yinghua Li, Liaoning (CN)

(73) Assignee: KEDE NUMERICAL CONTROL CO., LTD., Liaoning (CN)

( * ) Notice: Subject to any disclaimer, the term of this patent is extended or adjusted under 35 U.S.C. 154(b) by 197 days.

(21) Appl. No.: 17/600,920

(22) PCT Filed: Apr. 3, 2020

(86) PCT No.: PCT/CN2020/083220
§ 371 (c)(1),
(2) Date: Oct. 1, 2021

(87) PCT Pub. No.: WO2020/200308
PCT Pub. Date: Oct. 8, 2020

(65) Prior Publication Data
US 2022/0193842 A1    Jun. 23, 2022

(30) Foreign Application Priority Data
Apr. 4, 2019  (CN) .......................... 201910272780.8

(51) Int. Cl.
*B23C 1/08*     (2006.01)
*B23C 1/12*     (2006.01)
(Continued)

(52) U.S. Cl.
CPC ................ *B23Q 7/04* (2013.01); *B23C 1/002* (2013.01); *B23C 1/08* (2013.01); *B23Q 1/012* (2013.01);
(Continued)

(58) Field of Classification Search
CPC ....... B23Q 1/012; B23Q 39/00–39/048; B23Q 1/01–1/017; B23Q 7/04–7/048;
(Continued)

(56) References Cited

U.S. PATENT DOCUMENTS 4,614,128 A * 9/1986 Fickler ................ F16H 25/2018
74/89.31
4,926,709 A * 5/1990 Gardner .............. F16H 25/2018
74/89.31
(Continued)

FOREIGN PATENT DOCUMENTS

CN    103600232 A     2/2014
CN    204934696 U  *  1/2016
(Continued)

OTHER PUBLICATIONS

Machine Translation of DE 102010024348, which DE '348 was published Dec. 2010.*
(Continued)

*Primary Examiner* — Erica E Cadugan
(74) *Attorney, Agent, or Firm* — Muncy, Geissler, Olds & Lowe, P.C.

(57) ABSTRACT

The invention discloses a double-station gantry combined machining system allowing automatic overturning of workpieces, which comprises a first mobile gantry machining
(Continued)

unit, a second mobile gantry machining unit, an overturning platform, a first workpiece fixing table, a second workpiece fixing table and a guide rail, wherein the overturning platform is positioned between the first gantry machining unit and the second gantry machining unit. According to the invention, the system is highly integrated, continuous machining of a gantry machine tool is completed, the working efficiency is improved, and the machining cost of the system is reduced.

12 Claims, 7 Drawing Sheets

(51) Int. Cl.
| | | |
|---|---|---|
| *B23Q 1/01* | (2006.01) | |
| *B23Q 5/40* | (2006.01) | |
| *B23Q 7/04* | (2006.01) | |
| *B23Q 39/04* | (2006.01) | |
| *B23C 1/00* | (2006.01) | |
| *B23Q 39/00* | (2006.01) | |

(52) U.S. Cl.
CPC .............. *B23Q 5/40* (2013.01); *B23Q 39/04* (2013.01); *B23C 1/12* (2013.01); *B23Q 2039/002* (2013.01); *Y10T 409/30896* (2015.01); *Y10T 409/305264* (2015.01); *Y10T 409/306048* (2015.01); *Y10T 409/306776* (2015.01); *Y10T 409/307672* (2015.01); *Y10T 409/308288* (2015.01); *Y10T 409/308344* (2015.01)

(58) Field of Classification Search
CPC . B23Q 7/165; B23Q 5/40; B23Q 5/42; B23Q 5/44; B23C 1/002; B23C 1/04; B23C 1/08; B23C 1/10; Y10T 409/307728; Y10T 409/308288; Y10T 408/36–385; Y10T 409/307168; Y10T 409/307784; Y10T 409/308344; Y10T 409/308568; Y10T 409/309576; Y10T 408/91; Y10T 409/306776; Y10T 408/675; Y10T 408/6793; B23B 39/006; B23B 39/16–39/24; B24B 7/005; B24B 7/224; B24B 27/0023; B27C 3/04; B27C 9/04
USPC ....... 409/202, 212, 192, 203, 213, 217, 235, 409/185; 408/31–53, 234, 129, 137
See application file for complete search history.

(56) References Cited

U.S. PATENT DOCUMENTS

| | | | | |
|---|---|---|---|---|
| 5,265,986 | A * | 11/1993 | Prokopp | B23C 1/08 408/43 |
| 6,138,818 | A * | 10/2000 | Green | B23Q 1/52 29/33 P |
| 6,655,884 | B2 * | 12/2003 | Ferrari | B23Q 1/012 409/212 |
| 2005/0084345 | A1 * | 4/2005 | Frye | B23Q 1/46 408/129 |
| 2010/0006392 | A1 * | 1/2010 | Weinmann | B23Q 7/042 198/346.2 |
| 2012/0020753 | A1 * | 1/2012 | Tullmann | B23Q 1/54 409/168 |
| 2016/0193669 | A1 | 7/2016 | Chen | |
| 2019/0009376 | A1 | 1/2019 | Chen | |

FOREIGN PATENT DOCUMENTS

| | | |
|---|---|---|
| CN | 105946128 A | 9/2016 |
| CN | 106624084 A | 5/2017 |
| CN | 108115421 A | 6/2018 |
| CN | 109940442 A | 6/2019 |
| CN | 110039323 A * | 7/2019 |
| DE | 102010024348 A1 * | 12/2010 |
| DE | 102010024321 A1 * | 1/2011 |
| EP | 1777048 A1 * | 4/2007 |
| WO | WO-2020/200310 A1 * | 10/2020 |
| WO | WO-2020/200312 A1 * | 10/2020 |

OTHER PUBLICATIONS

Machine Translation of DE 102010024348, which DE '348 was published Dec. 30, 2010.*

* cited by examiner

—Prior Art—

DOUBLE-STATION GANTRY COMBINED PROCESSING SYSTEM FOR AUTOMATICALLY OVERTURNING AND PROCESSING WORKPIECES

BACKGROUND OF THE INVENTION

1. Technical Field

The invention relates to the technical field of machining, in particular to a double-station gantry combined machining system allowing automatic overturning of workpieces.

2. Description of Related Art

Gantry machine tools include gantry milling machines and planers. A gantry machine tool mainly comprises a portal frame and a machine tool bed workbench. The portal frame is composed of columns and a top beam, and cross beams are arranged in the middle. The cross beam may move upwards and downwards along two column guide rails. A machining cutter head or milling head perpendicular to a spindle is installed on the cross beam. The machining cutter head or milling head may move transversely along a cross beam guide rail.

When an existing gantry machine tool is used for machining workpieces, the workpieces need to be removed from the guide rail and reloaded.

BRIEF SUMMARY OF THE INVENTION

The invention provides a double-station gantry combined machining system allowing automatic overturning of workpieces to solve the above technical problems.

The double-station gantry combined machining system allowing automatic overturning of workpieces comprises:

A first mobile gantry machining unit, a second mobile gantry machining unit, an overturning platform, a first workpiece fixing table, a second workpiece fixing table, a guide rail and a workbench, wherein the overturning platform is arranged on the workbench and positioned between the first gantry machining unit and the second gantry machining unit;

The first mobile gantry machining unit comprises a first cross beam, a first workpiece grabbing structure, a first double-drive screw transmission structure and a first side rocker unit, and the second mobile gantry machining unit comprises a second cross beam, a second workpiece grabbing structure, a second double-drive screw transmission structure and a second side rocker;

The first workpiece grabbing structure is arranged on a side, opposite to the second cross beam, of the first cross beam, the first double-drive screw transmission structure is arranged on the other side of the first cross beam, the second workpiece grabbing structure is arranged on a side, opposite to the first cross beam, of the second cross beam, the second double-drive screw transmission structure is arranged on the other side of the second cross beam, the first double-drive screw transmission structure drives the first side rocker to move upwards and downwards, and the second double-drive screw transmission structure drives the second side rocker to move upwards and downwards;

The first workpiece grabbing structure is used for grabbing a workpiece on the first workpiece fixing table or the overturning platform and placing the workpiece on the overturning platform or the first workpiece fixing table, the second workpiece grabbing structure is used for grabbing a workpiece on the second workpiece fixing table or the overturning platform and placing the workpiece on the overturning platform or the second workpiece fixing table, and the overturning platform is arranged on the guide rail and used for overturning the workpiece.

Further, the first workpiece grabbing structure and the second workpiece grabbing structure each comprise:

A workpiece clamping machine, a bracket, a slide block, grabbing guide rails, a hydraulic cylinder and a gantry machine tool;

The slide block is fixed in the middle of a cross beam of a gantry machine tool, the grabbing guide rails are fixed on the bracket and connected with the slide block, the hydraulic cylinder is fixed on the cross beam, a hydraulic rod of the hydraulic cylinder is connected with the bracket, the hydraulic cylinder drives the bracket to move upwards and downwards along the slide block, and a lower end of the bracket is provided with the workpiece clamping machine;

The bracket comprises a vertical supporting part and a transverse fixing part, the transverse fixing part has an end fixedly connected with a bottom end of the vertical supporting part and an end fixing the workpiece clamping machine, and the transverse fixing part is positioned on a side close to the double-drive screw transmission structure.

Further, each side rocker unit comprises a rocker, a ram, a saddle, rocker guide rails, first slide block groups, second slide block groups and third slide block groups, One side of the saddle is provided with a receiving groove, the first slide block groups, the second slide block groups and the third slide block groups are arranged on two inner walls of the receiving groove, the ram is placed in the receiving groove, the rocker guide rails are arranged on surfaces, corresponding to the two inner walls of the receiving groove, of the ram, the rocker guide rails are connected with the first slide block groups, the second slide block groups and the third slide block groups, and the rocker is arranged on a side, opposite to the saddle, of the ram.

Further, the ram is provided with a fixing table for fixing the rocker, and the fixing table comprises a first fixing plate, a second fixing plate, a third fixing plate and a supporting plate;

The first fixing plate and the second fixing plate are parallel to each other and perpendicular to the supporting plate, the supporting plate is provided with a through hole for fixing the rocker, and the third fixing plate is perpendicular to the first fixing plate, the second fixing plate and the supporting plate; and the first fixing plate, the second fixing plate, the third fixing plate and the supporting plate are integrally formed, the third fixing plate is parallel to the ram, and the first fixing plate, the second fixing plate and the supporting plate are integrally formed with the ram.

Further, the fixing table further comprises a first fixing frame, a second fixing frame and a third fixing frame;

The first fixing frame and the second fixing frame are both parallel to and above the supporting plate, the first fixing frame and the second fixing frame are connected with the ram, and outward edges of the first fixing frame and the second fixing frame are both in a shape matching a radian of a side, close to the ram, of the through hole; and the third fixing frame penetrates through the second fixing frame and intersects with the supporting plate and the first fixing frame, and is perpendicular to the first fixing frame, the second fixing frame and the supporting plate.

Further, the first double-drive screw transmission structure and the second double-drive screw transmission structure each comprise:

A saddle, a first driving motor, a second driving motor, a first motor base, a second motor base, a first synchronous belt, a second synchronous belt, a lead screw, a first driving wheel, a second driving wheel, a first driven wheel and a second driven wheel;

The lead screw is fixed on the saddle through an upper support and a lower support, the first motor base and the second motor base are fixed on a top of the saddle, the first driving motor and the second driving motor are respectively fixed on the first motor base and the second motor base, the first driving wheel is connected with the first driving motor, and the second driving wheel is connected with the second driving motor; and the first driven wheel and the second driven wheel are both connected with the lead screw, the first synchronous belt is connected with the first driving wheel and the first driven wheel, and the second synchronous belt is connected with the second driving wheel and the second driven wheel.

Further, an included angle between the first synchronous belt and the second synchronous belt is 60°-180°.

Further, a distance between the first driven wheel and the second driven wheel is not greater than 50 mm.

According to the invention, the system is highly integrated, continuous machining of the gantry machine tool is completed, the working efficiency is improved, and the machining cost of the system is reduced.

BRIEF DESCRIPTION OF THE SEVERAL VIEWS OF THE DRAWINGS

In order to more clearly explain the embodiments of the invention or the technical solution in the prior art, the following will briefly introduce the drawings needed in the description of the embodiments or the prior art. Obviously, the drawings in the following description only illustrate some embodiments of the invention. For those of ordinary skill in the art, other drawings can be obtained according to the following ones without creative labor.

DESCRIPTION OF REFERENCE NUMERALS

101—first mobile gantry machining unit, 102—second mobile gantry machining unit, 103—overturning platform, 104—side rocker, 105—ram, 106—Z-axis double-drive screw transmission structure, 107—saddle, 108—workpiece grabbing structure;

201—workpiece clamping machine, 202—bracket, 202.1—transverse fixing part, 202.2—vertical supporting part, 203—slide block, 204—grabbing guide rail, 205—hydraulic cylinder, 206—gantry machine tool, 207—lead screw, 208—lead screw nut, 209—driving motor, 210—clamping jaw;

301—rocker, 302—ram, 303—rocker guide rail, 304.1—first slide block, 304.2—second slide block, 304.3—third slide block, 305—saddle, 306—diagonal plane, 307.1—first fixing plate, 307.2—second fixing plate, 307.3—third fixing plate, 308—support plate, 309.1—first fixing frame, 309.2—second fixing frame, 309.3—third fixing frame;

401—saddle, 402—lead screw, 404—lower support, 405—upper support, 408.1—first synchronous belt, 408.2—second synchronous belt, 409.1—first driving wheel, 409.2—second driving wheel, 410.1—first driven wheel, 410.2—second driven wheel, 411.1—first driving motor, 411.2—second driving motor, 412.1—first motor base, 412.2—second motor base, 413—flange.

DETAILED DESCRIPTION OF THE INVENTION

In order to make the purposes, technical solutions and advantages of the embodiments of the invention clearer, the technical solutions in the embodiments of the invention will be described clearly and completely below with reference to the drawings in the embodiments of the invention. Obviously, the described embodiments are merely illustrative ones, and are not all possible ones of the invention. Based on the embodiments of the invention, all other embodiments obtained by those of ordinary skill in the art without creative labor are within the scope of the invention.

Figure 1:
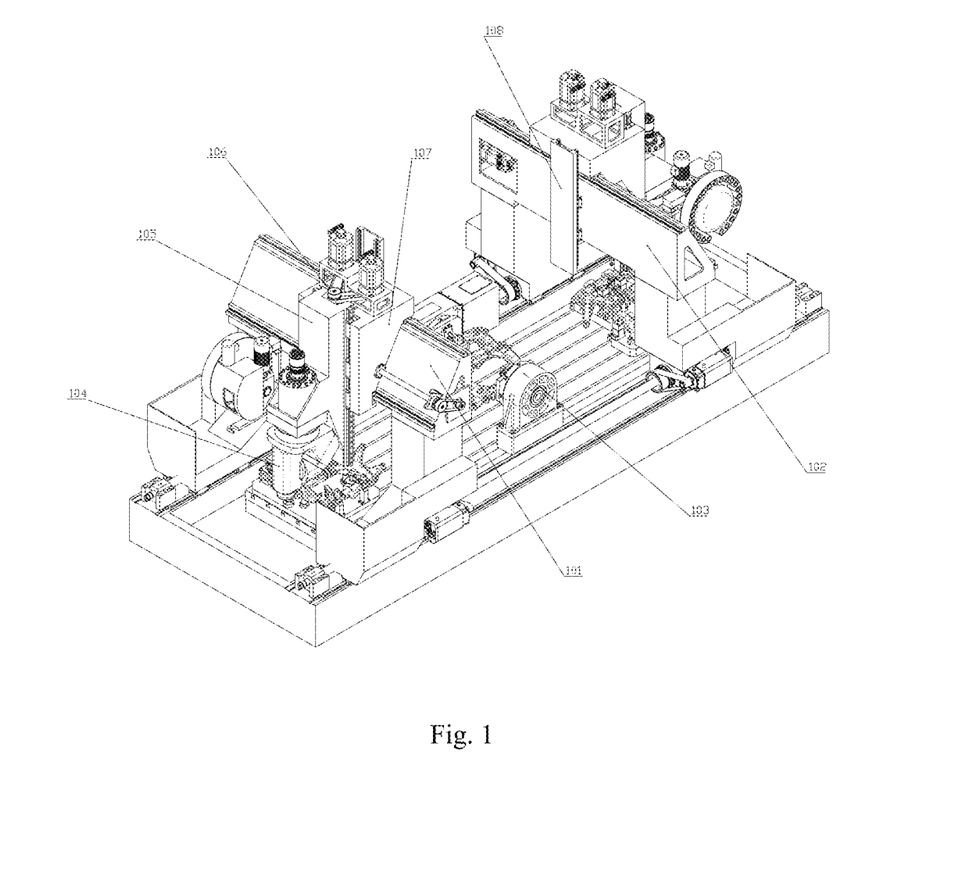
FIG. 1 is a structural diagram of a double-station gantry combined machining system allowing automatic overturning of workpieces according to the invention.

FIG. 1 is a structural diagram of a double-station gantry combined machining system allowing automatic overturning of workpieces according to the invention. As shown in FIG. 1, the system of the embodiment may comprise:

A first mobile gantry machining unit, a second mobile gantry machining unit, an overturning platform, a first workpiece fixing table, a second workpiece fixing table, a guide rail and a workbench, wherein the overturning platform is arranged on the workbench and positioned between the first gantry machining unit and the second gantry machining unit;

The first mobile gantry machining unit comprises a first cross beam, a first workpiece grabbing structure, a first double-drive screw transmission structure and a first side rocker unit, and the second mobile gantry machining unit comprises a second cross beam, a second workpiece grabbing structure, a second double-drive screw transmission structure and a second side rocker;

The first workpiece grabbing structure is arranged on a side, opposite to the second cross beam, of the first cross beam, the first double-drive screw transmission structure is arranged on the other side of the first cross beam, the second workpiece grabbing structure is arranged on a side, opposite to the first cross beam, of the second cross beam, the second double-drive screw transmission structure is arranged on the other side of the second cross beam, the first double-drive screw transmission structure drives the first side rocker to move upwards and downwards, and the second double-drive screw transmission structure drives the second side rocker to move upwards and downwards;

The first workpiece grabbing structure is used for grabbing a workpiece on the first workpiece fixing table or the overturning platform and placing the workpiece on the overturning platform or the first workpiece fixing table, the second workpiece grabbing structure is used for grabbing a workpiece on the second workpiece fixing table or the overturning platform and placing the workpiece on the overturning platform or the second workpiece fixing table, and the overturning platform is arranged on the guide rail and used for overturning the workpiece.

Figure 2:
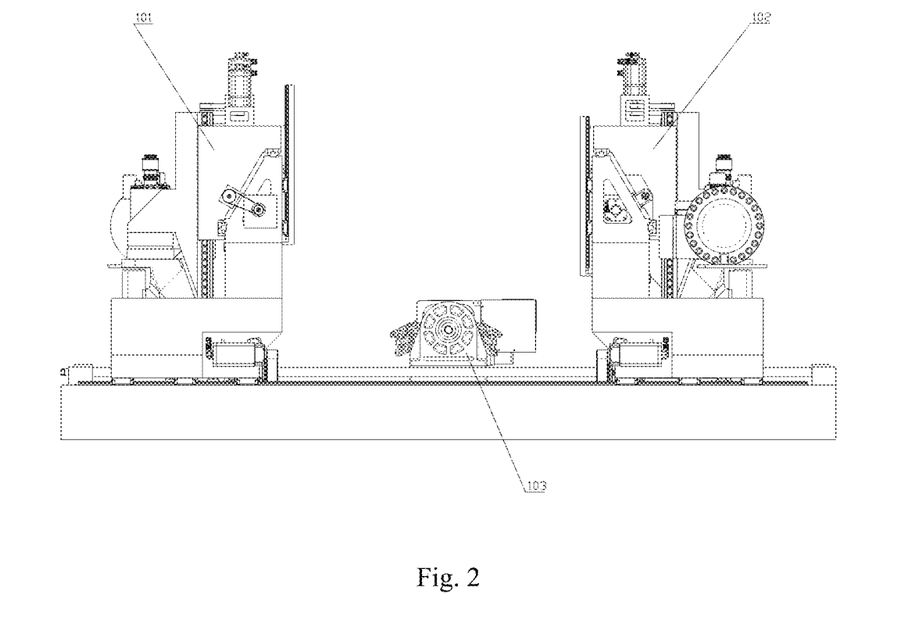
FIG. 2 is another structural diagram of a double-station gantry combined machining system allowing automatic overturning of workpieces according to the invention.

Specifically, after the first mobile gantry machining unit of this embodiment finishes one side of the workpiece, the workpiece is taken out from the first workbench through the first workpiece grabbing structure, and the first mobile gantry drives the workpiece to move to the overturning platform. The first workpiece grabbing structure places the workpiece on the overturning platform. The overturning platform overturns the workpiece. The overturning platform is fixed on the workbench and may be an overturning structure in the prior art, which is not limited in this embodiment. The second mobile gantry moves to the overturning platform, and the overturned workpiece is taken away by the second workpiece grabbing structure and moved to the second workbench. Machining of the other side of the workpiece is finished on the second workbench. The first mobile gantry machining unit and the second mobile machining unit may also independently machine the workpiece at the same time, which realizes continuous machining of the workpiece, and saves the time for unloading the workpiece from the guide rail and then reloading the workpiece, and thus improving the working efficiency. A side view of the system is shown in FIG. 2. Other structures of the machine tool are from the prior art, which will not be described here.

Further, the first workpiece grabbing structure and the second workpiece grabbing structure each comprise:

A workpiece clamping machine, a bracket, a slide block, grabbing guide rails, a hydraulic cylinder and a gantry machine tool;

The slide block is fixed in the middle of a cross beam of the gantry machine tool, the grabbing guide rails are fixed on the bracket and connected with the slide block, the hydraulic cylinder is fixed on the cross beam, a hydraulic rod of the hydraulic cylinder is connected with the bracket, the hydraulic cylinder drives the bracket to move upwards and downwards along the slide block, and a lower end of the bracket is provided with the workpiece clamping machine;

The bracket comprises a vertical supporting part and a transverse fixing part, one end of the transverse fixing part is fixedly connected with a bottom end of the vertical supporting part, the other end of the transverse fixing part fixes the workpiece clamping machine, and the transverse fixing part is positioned on a side close to the double-drive screw transmission structure.

Figure 3:
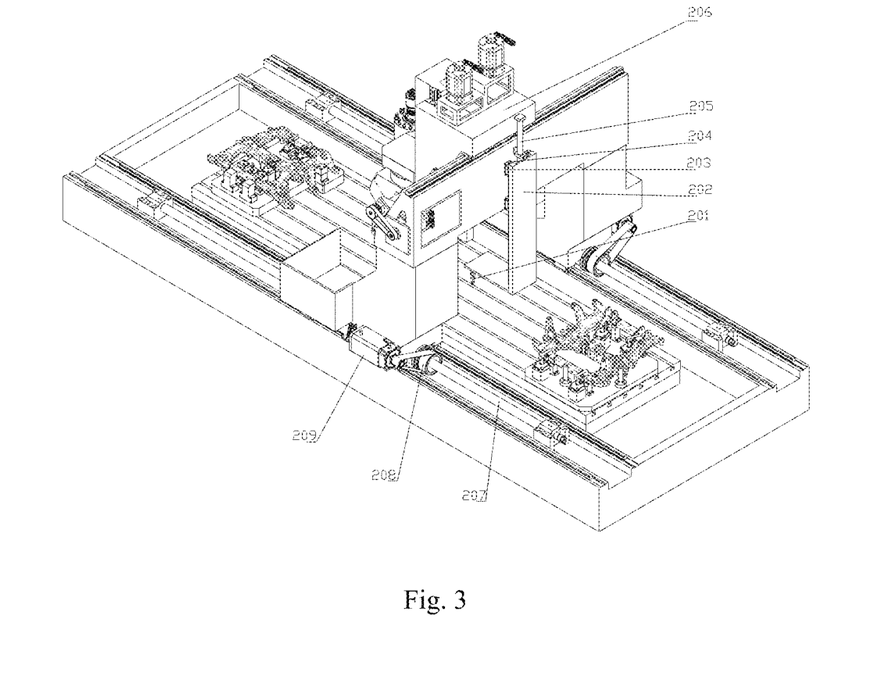
FIG. 3 is a structural diagram of a workpiece grabbing structure according to the invention.
Figure 4:
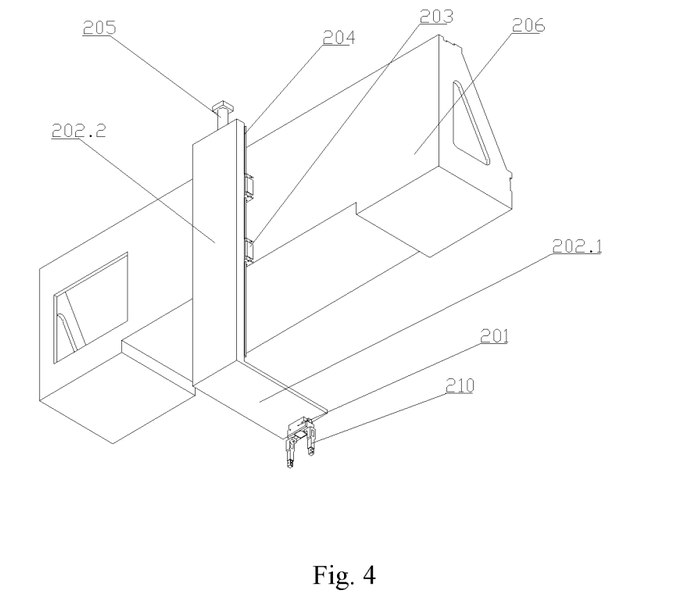
FIG. 4 is a structural diagram of a workpiece grabbing structure according to the invention.

Specifically, as shown in FIGS. 3 and 4, the workpiece clamping machine in this embodiment comprises pneumatic fingers and clamping jaws, and the clamping jaws are installed on the pneumatic fingers. The clamping jaws are driven by the pneumatic fingers to open and close to clamp the workpiece. In this embodiment, four slide blocks are provided, which are respectively fixed at four positions, namely, top, bottom, left and right, in the middle of the cross beam of the gantry machine tool. Two grabbing guide rails are provided and fixed between the vertical supporting part and the slide blocks.

When the workpiece on the gantry machine tool needs to be transferred, a driving motor of the gantry machine tool drives a portal frame to move to a position above the workpiece through a lead screw and a lead screw nut, and the bracket is lowered under the drive of the hydraulic cylinder, so that the workpiece clamping machine at a lower end of the bracket is lowered to a position where the workpiece is located. The workpiece clamping machine opens its clamping jaws through a pneumatic device to clamp the workpiece, then the bracket drives the workpiece clamping machine to lift the workpiece under the drive of the hydraulic cylinder, the workpiece is transferred by the portal frame to be above a target position, the hydraulic cylinder drives the bracket to descend to the target position, and the workpiece clamping machine releases the workpiece to complete the transfer. The workpiece transferring device may be driven by the cross beam of the gantry machine tool to transfer the workpiece without moving the workpiece out of the machine tool, thus improving the working efficiency. The transferring process is completed by the machine tool, and no separate transferring mechanism is needed, thus saving the labor cost.

In this embodiment, the workpiece transferring device is arranged in the middle of the cross beam of the gantry machine tool, the workpiece transferring device comprises the workpiece clamping machine, the bracket, the slide blocks, the guide rails and the hydraulic cylinder. The hydraulic cylinder is fixed in the middle of the cross beam of the gantry machine tool, a hydraulic rod of the hydraulic cylinder is connected with the bracket, the slide blocks are fixed on the cross beam, the guide rails are vertically fixed on two sides of the bracket, and the slide blocks are connected with the guide rails. The hydraulic cylinder may drive the bracket to make the bracket move upwards and downwards along the guide rails on the slide blocks. The lower end of the bracket is provided with the workpiece clamping machine, which may move along with the cross beam of the gantry machine tool to transfer the workpiece after clamping the workpiece, thus reducing the workpiece transferring time and improving the working efficiency.

Further, each side rocker comprises a rocker, a ram, a saddle, rocker guide rails, a first slide block, a second slide block and a third slide block, The rocker guide rails are fixed on one side of the ram, the rocker is fixed on the other side of the ram, one ends of the first slide block, the second slide block and the third slide block slide on the guide rails, and the other ends of the first slide block, the second slide block and the third slide block are fixed on a same side of the saddle at equal intervals.

Figure 5:
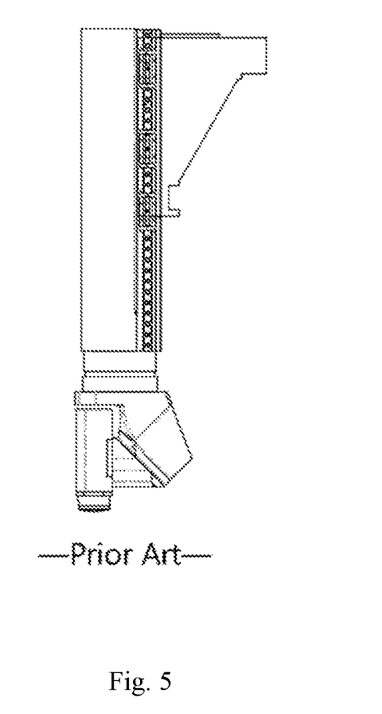
FIG. 5 is a structural diagram of an installation position of a rocker in the prior art.

Specifically, as shown in FIG. 5, the rocker of the existing gantry machine tool is installed on a lower end face of the ram, and a distance between an installation face of the rocker and a lowermost pair of slide blocks on the saddle is large, so that the deformation of the ram is large.

Figure 6:
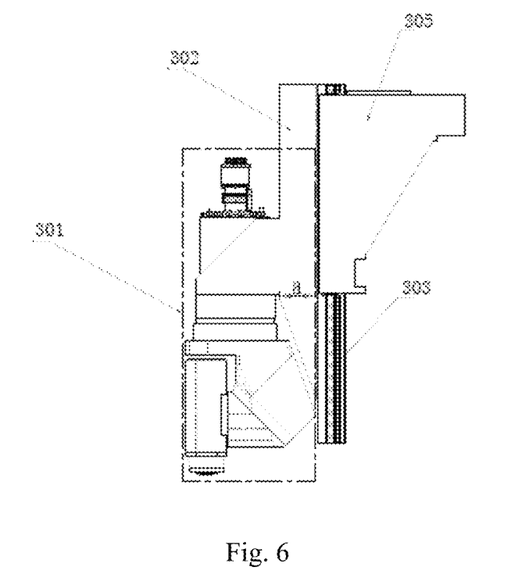
FIG. 6 is a side view of a ram of a side rocker according to the invention.
Figure 7:
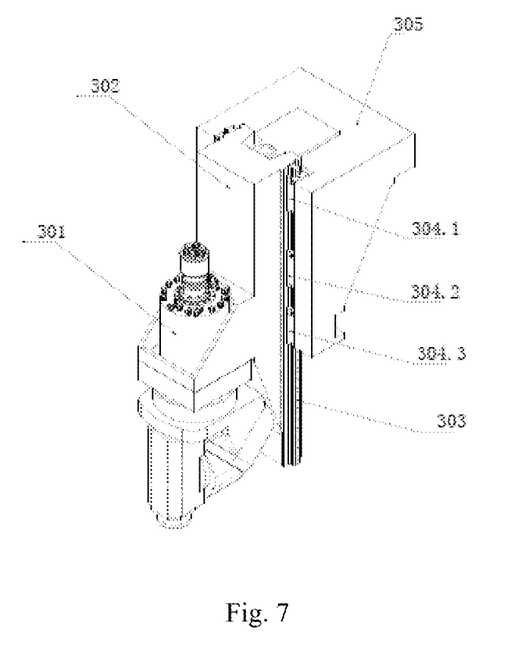
FIG. 7 is a three-dimensional structural diagram of a ram of a side rocker according to the invention.
Figure 8:
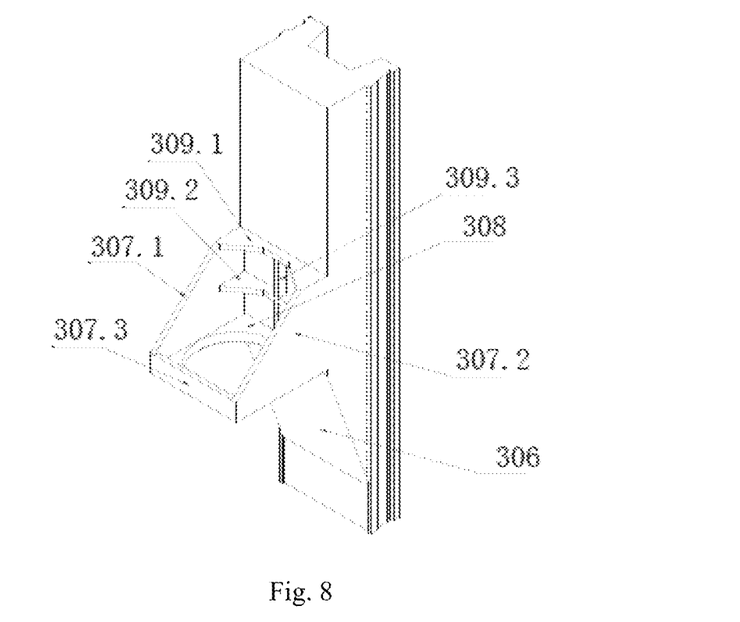
FIG. 8 is a structural diagram of a ram of a side rocker according to the invention.

A rocker and ram structure of the invention is shown in FIGS. 6 and 7. The rocker is arranged on a fixing table at a front end of the ram, the guide rails are fixed at a rear end of the ram opposite to the fixing table, and the first slide block, the second slide block and the third slide block are fixed on the saddle and slide on the guide rails. As shown in FIG. 8, the fixing table is integrally formed with the ram, and comprises a first fixing plate, a second fixing plate, a third fixing plate and a supporting plate, wherein the first fixing plate and the second fixing plate have the same shape and size, and are arranged parallel to each other and perpendicular to the supporting plate, and the supporting plate is provided with a through hole for fixing the rocker; and the third fixing plate is perpendicular to the first fixing plate, the second fixing plate and the supporting plate, and parallel to a side, where the fixing table is fixed, of the ram, and the first fixing plate, the second fixing plate, the third fixing plate and the supporting plate are integrally formed. The fixing table is formed by the combination of a plurality of fixing plates, thus improving the rigidity of the fixing table, so that the rocker may be supported more stably and is unlikely to shake in operation.

Further, the ram is provided with a fixing table for fixing the rocker, and the fixing table comprises a first fixing plate, a second fixing plate, a third fixing plate and a supporting plate;

The first fixing plate and the second fixing plate are parallel to each other and perpendicular to the supporting plate, the supporting plate is provided with a through hole for fixing the rocker, and the third fixing plate is perpendicular to the first fixing plate, the second fixing plate and the supporting plate; and the first fixing plate, the second fixing plate, the third fixing plate and the supporting plate are integrally formed, the third fixing plate is parallel to the ram, and the first fixing plate, the second fixing plate and the supporting plate are integrally formed with the ram.

Further, the fixing table further comprises a first fixing frame, a second fixing frame and a third fixing frame;

The first fixing frame and the second fixing frame are both parallel to and above the supporting plate, the first fixing frame and the second fixing frame are connected with the ram, and outward edges of the first fixing frame and the second fixing frame are both in a shape matching a radian of a side, close to the ram, of the through hole; and the third fixing frame penetrates through the second fixing frame and intersects with the supporting plate and the first fixing frame, and is perpendicular to the first fixing frame, the second fixing frame and the supporting plate.

Specifically, the first fixing frame and the second fixing frame have the same shape and size, the first fixing frame and the second fixing frame are rectangular and one side is an inward concave arc, and a radian of the arc matches the radian of the side, close to the ram, of the through hole of the supporting plate. The first fixing frame and the second fixing frame are parallel to and above the supporting plate, and the second fixing frame is positioned between the supporting plate and the first fixing frame. The third fixing frame is rectangular and has a width equal to a distance between the through hole of the supporting plate and the ram. The third fixing frame is perpendicular to the first fixing frame, the second fixing frame and the supporting plate. The third fixing frame passes through the second fixing frame and intersects with the supporting plate and the first fixing frame. The first fixing frame, the second fixing frame and the third fixing frame are all integrally formed with the fixing table. The first fixing frame, the second fixing frame and the third fixing frame further stabilize the rocker, strengthen the stability of the rocker, increase the rigidity of the whole structure, and reduce the deformation of the ram.

The supporting plate of the fixing table and the third slide block have a same height, which is a height of the third slide block when the saddle is located at a top of the guide rails, and is also a height of the rocker fixed by the fixing table. This height makes a distance between the installation face of the rocker and the third slide block on the saddle smaller, so that the deformation of the ram is small in operation and the working efficiency is improved. A part, below the fixing table, of the ram is designed as a wedge-shaped structure with thickness a gradually decreasing downwards, so as to reserve enough working space for the rocker.

The supporting plate is as high as the third slide block when the saddle is located at the top of the guide rails, and the third slide block is located below the first slide block and the second slide block. A thickness of the ram below the supporting plate decreases gradually downwards. According to the invention, the problem that the distance between the installation face of the rocker and the lowermost pair of slide blocks on the saddle is large, which may lead to serious deformation of the ram is solved, and the machining accuracy is effectively improved.

Further, the first double-drive screw transmission structure and the second double-drive screw transmission structure each comprise:

A saddle, a first driving motor, a second driving motor, a first motor base, a second motor base, a first synchronous belt, a second synchronous belt, a lead screw, a first driving wheel, a second driving wheel, a first driven wheel and a second driven wheel;

The lead screw is fixed on the saddle through an upper support and a lower support, the first motor base and the second motor base are fixed on a top of the saddle, the first driving motor and the second driving motor are respectively fixed on the first motor base and the second motor base, the first driving wheel is connected with the first driving motor, and the second driving wheel is connected with the second driving motor; and the first driven wheel and the second driven wheel are both connected with the lead screw, the first synchronous belt is connected with the first driving wheel and the first driven wheel, and the second synchronous belt is connected with the second driving wheel and the second driven wheel.

Figure 9:
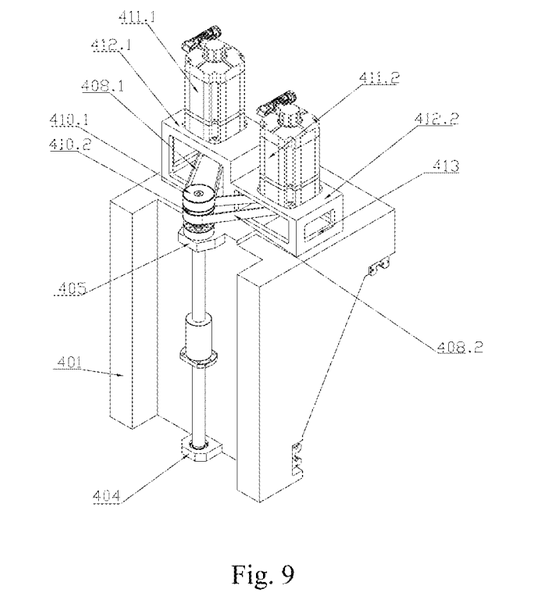
FIG. 9 is an overall structural diagram of a double-drive screw transmission structure according to the invention.
Figure 10:
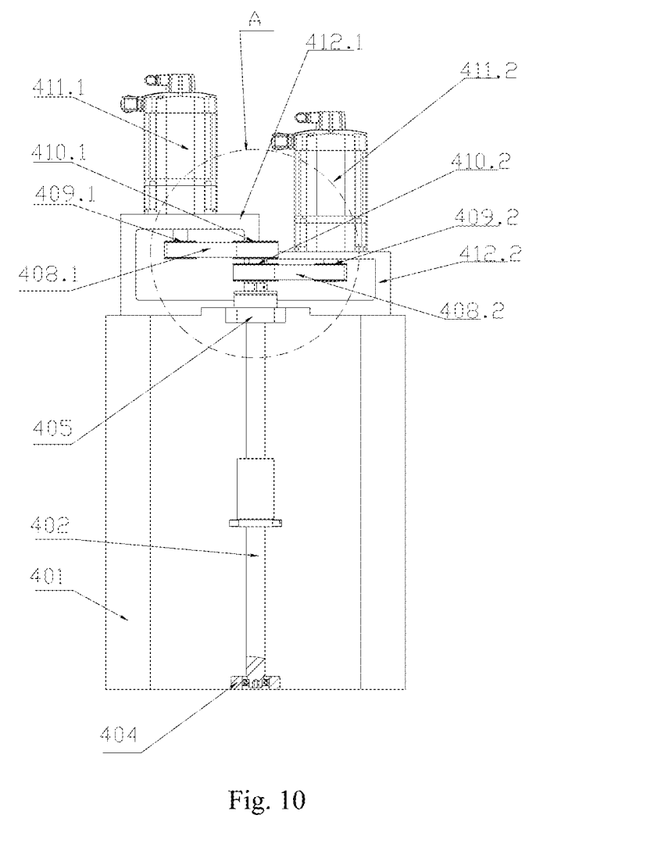
FIG. 10 is a front structural diagram of a double-drive screw transmission structure according to the invention.

Specifically, the first motor base and the second motor base in this embodiment are two hollow steel cages with different heights, and the first driving motor and the second driving motor are respectively fixed on upper surfaces of the two hollow steel cages. Edges of the first motor base and the second motor base, except those on upper surfaces corresponding to the lead screw, are provided with flanges extending to opposite sides. As shown in FIGS. 9 and 10, two ends of the lead screw are respectively fixed to the upper support and the lower support through bearings, and the upper support and the lower support are integrally formed with the saddle. The first motor base and the second motor base are hollow steel cages with different heights, the first motor base is higher than the second motor base, the first driving motor is fixed on the first motor base, and the second driving motor is fixed on the second motor base. Top surfaces of the first motor base and the second motor base are reserved with through holes through which motor shafts of the first driving motor and the second driving motor may pass, and the first motor base and the second motor base are fixed on the saddle by bolts.

The first driving wheel is connected with the first driving motor, the first driven wheel is connected with a top end of the lead screw, the second driving wheel is connected with the second driving motor, and the second driven wheel is connected with the top end of the lead screw; the first driven wheel is arranged above the second driven wheel, the first driving wheel and the first driven wheel are in a same horizontal plane, and the second driving wheel and the second driven wheel are in a same horizontal plane; and the first synchronous belt is connected with the first driving wheel and the first driven wheel, the second synchronous belt is connected with the second driving wheel and the second driven wheel, and the first driven wheel and the second driven wheel are connected with the lead screw through expansion sleeves, so that the first driven wheel and the second driven wheel are firmly connected with the lead screw without moving upwards and downwards or rotating along the lead screw under the expansion effect of expansion sleeves. When the first driving motor and the second driving motor are started, the first driving wheel and the second driving wheel respectively drive the first synchronous belt and the second synchronous belt to operate, which further respectively drive the first driven wheel and the second driven wheel to operate, thereby allowing the first driven wheel and the second driven wheel to drive the lead screw to operate. The design of a single lead screw reduces a space occupied by a driving device of the machine tool and saves the cost. Meanwhile, the hollow steel cage design of the motor bases is beneficial to the overhaul and maintenance of the first synchronous belt, the second synchronous belt, the first driving wheel and the second driving wheel.

The first motor base and the second motor base respectively support the first driving motor and the second driving motor. In order to improve the supporting stability and allow the first driving motor and the second driving motor to be firmly seated on the first motor base and the second motor base, each side of the first motor base and the second motor base is provided with flanges extending to opposite sides, which improves the rigidity and supporting stability of the first motor base and the second motor base, prevents the first driving motor and the second driving motor from vibrating violently during operation and reduces the working efficiency.

Further, an included angle between the first synchronous belt and the second synchronous belt is 60°-180°.

Specifically, by adjusting the positions of the first driving motor and the second driving motor, the included angle between the first synchronous belt and the second synchronous belt is 60°-180°. The angle enables the first driving motor and the second driving motor to better drive the lead screw to work, and reduces a resultant force of pretightening forces of the two belts, thereby reducing a stress on the bearing and prolonging the service life of equipment.

Further, a distance between the first driven wheel and the second driven wheel is not greater than 50 mm.

Figure 11:
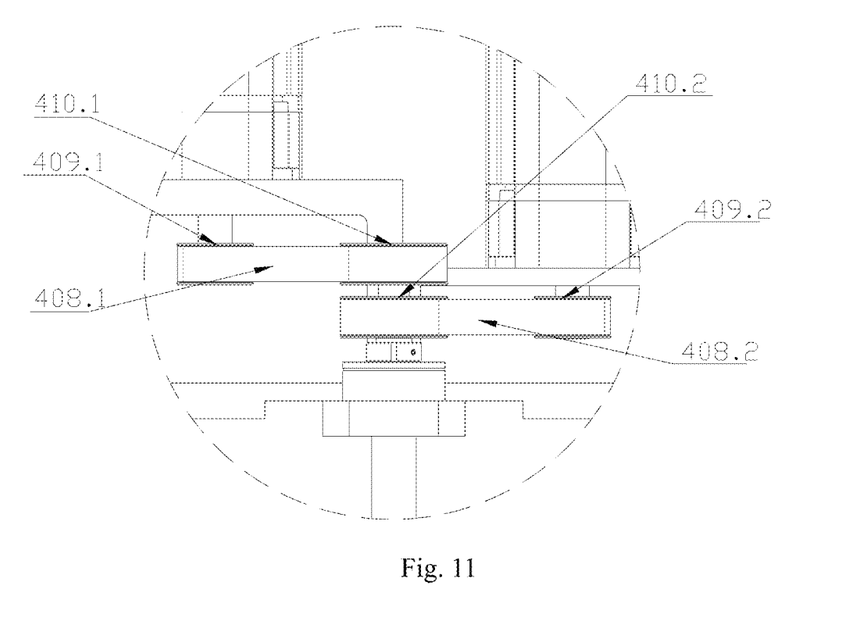
FIG. 11 is an enlarged view of part A in FIG. 10.

Specifically, as shown in FIG. 11, the smaller the distance between the first driven wheel and the second driven wheel, the better. The smaller the distance, the shorter an overhanging length of the lead screw and the smaller a bending moment, which makes the lead screw hard to deform. Therefore, the distance between the first driven wheel and the second driven wheel should not exceed 50 mm.

Finally, it should be noted that the above embodiments are only used to illustrate the technical solutions of the invention, but not to limit them. Although the invention has been described in detail with reference to the foregoing embodiments, those of ordinary skill in the art should understand that the technical solutions described in the foregoing embodiments can still be modified, or some or all of the technical features can be equivalently replaced, and these modifications or substitutions do not make the essence of the corresponding technical solutions deviate from the scope of the technical solutions of each embodiment of the invention.

What is claimed is:

1. A double-station gantry machining system allowing automatic overturning of workpieces, comprising:
    a first mobile gantry machining unit, a second mobile gantry machining unit, an overturning platform, a first workpiece fixing table, a second workpiece fixing table, a guide rail and a workbench, wherein the overturning platform is arranged on the workbench and positioned between the first gantry machining unit and the second gantry machining unit;
    the first mobile gantry machining unit comprises a first cross beam, a first workpiece grabbing structure, a first double-drive screw transmission structure and a first side rocker unit, the first side rocker unit comprising a first side rocker, and the second mobile gantry machining unit comprises a second cross beam, a second workpiece grabbing structure, a second double-drive screw transmission structure and a second side rocker unit, the second side rocker unit comprising a second side rocker;
    the first workpiece grabbing structure is arranged on a side of the first cross beam, the first double-drive screw transmission structure is arranged on another side of the first cross beam, the second workpiece grabbing structure is arranged on a side of the second cross beam, the second double-drive screw transmission structure is arranged on another side of the second cross beam, the first double-drive screw transmission structure drives the first side rocker to move upwards and downwards, and the second double-drive screw transmission structure drives the second side rocker to move upwards and downwards;
    the first workpiece grabbing structure is used for grabbing a workpiece that is on the first workpiece fixing table or that is on the overturning platform and placing the workpiece on the overturning platform or the first workpiece fixing table, respectively, the second workpiece grabbing structure is used for grabbing a workpiece that is on the second workpiece fixing table or that is on the overturning platform and placing the workpiece on the overturning platform or the second workpiece fixing table, respectively, and the overturning platform is arranged on the guide rail and is configured to overturn the workpiece.

2. The system according to claim 1, wherein the first workpiece grabbing structure comprises:
    a first workpiece clamping machine, a first bracket, a first slide block, first grabbing guide rails and a first hydraulic cylinder;
    the first slide block is fixed in a middle of the first cross beam of the first mobile gantry machining unit, the first grabbing guide rails are fixed on the first bracket and connected with the first slide block, the first hydraulic cylinder is fixed on the first cross beam, a hydraulic rod of the first hydraulic cylinder is connected with the first bracket, the first hydraulic cylinder drives the first bracket to move upwards and downwards along the first slide block, and a lower end of the first bracket is provided with the first workpiece clamping machine;
    the first bracket comprises a first vertical supporting part and a first transverse fixing part, the first transverse fixing part has an end fixedly connected with a bottom end of the first vertical supporting part, and the first transverse fixing part has an end fixing the first workpiece clamping machine.

3. The system according to claim 2, wherein the second workpiece grabbing structure comprises:
    a second workpiece clamping machine, a second bracket, a second slide block, second grabbing guide rails and a second hydraulic cylinder;
    the second slide block is fixed in a middle of the second cross beam of the second mobile gantry machining unit, the second grabbing guide rails are fixed on the second bracket and connected with the second slide block, the second hydraulic cylinder is fixed on the second cross beam, a hydraulic rod of the second hydraulic cylinder is connected with the second bracket, the second hydraulic cylinder drives the second bracket to move upwards and downwards along the second slide block, and a lower end of the second bracket is provided with the second workpiece clamping machine;

the second bracket comprises a second vertical supporting part and a second transverse fixing part, the second transverse fixing part has an end fixedly connected with a bottom end of the second vertical supporting part, and the second transverse fixing part has an end fixing the second workpiece clamping machine.

4. The system according to claim 1, wherein said first side rocker unit comprises the first rocker, a first ram, a first saddle, first rocker guide rails, first first slide block groups, first second slide block groups and first third slide block groups;

wherein one side of the first saddle is provided with a first receiving groove, wherein the first first slide block groups, the first second slide block groups and the first third slide block groups are arranged on two inner walls of the first receiving groove, the first ram is placed in the first receiving groove, the first rocker guide rails are arranged on surfaces, corresponding to the two inner walls of the first receiving groove, of the first ram, the first rocker guide rails are connected with the first first slide block groups, the first second slide block groups and the first third slide block groups, and the first rocker is arranged on a side of the first ram;

wherein said second side rocker unit comprises the second rocker, a second ram, a second saddle, second rocker guide rails, second first slide block groups, second second slide block groups and second third slide block groups;

wherein one side of the second saddle is provided with a second receiving groove, wherein the second first slide block groups, the second second slide block groups and the second third slide block groups are arranged on two inner walls of the second receiving groove, the second ram is placed in the second receiving groove, the second rocker guide rails are arranged on surfaces, corresponding to the two inner walls of the second receiving groove, of the second ram, the second rocker guide rails are connected with the second first slide block groups, the second second slide block groups and the second third slide block groups, and the second rocker is arranged on a side of the second ram.

5. The system according to claim 4, wherein the first ram is provided with a first fixing table for fixing the first rocker, and the first fixing table comprises a first first fixing plate, a first second fixing plate, a first third fixing plate and a first supporting plate;

the first first fixing plate and the first second fixing plate are parallel to each other and perpendicular to the first supporting plate, the first supporting plate is provided with a first through hole for fixing the first rocker, and the first third fixing plate is perpendicular to the first first fixing plate, the first second fixing plate and the first supporting plate; and the first first fixing plate, the first second fixing plate, the first third fixing plate and the first supporting plate are integrally formed, the first third fixing plate is parallel to the ram, and the first first fixing plate, the first second fixing plate and the first supporting plate are integrally formed with the first ram;

wherein the second ram is provided with a second fixing table for fixing the second rocker, and the second fixing table comprises a second first fixing plate, a second second fixing plate, a second third fixing plate and a second supporting plate;

the second first fixing plate and the second second fixing plate are parallel to each other and perpendicular to the second supporting plate, the second supporting plate is provided with a second through hole for fixing the second rocker, and the second third fixing plate is perpendicular to the second first fixing plate, the second second fixing plate and the second supporting plate; and the second first fixing plate, the second second fixing plate, the second third fixing plate and the second supporting plate are integrally formed, the second third fixing plate is parallel to the ram, and the second first fixing plate, the second second fixing plate and the second supporting plate are integrally formed with the second ram.

6. The system according to claim 5, wherein the first fixing table further comprises a first first fixing frame, a first second fixing frame and a first third fixing frame;

wherein the first first fixing frame and the first second fixing frame are both parallel to and above the first supporting plate, wherein the first first fixing frame and the first second fixing frame are connected with the first ram, and outward edges of the first first fixing frame and the first second fixing frame are both in a shape matching a shape of a side of the first through hole; and wherein the first third fixing frame penetrates through the first second fixing frame and intersects with the first supporting plate and the first first fixing frame, and is perpendicular to the first first fixing frame, the first second fixing frame and the first supporting plate;

wherein the second fixing table further comprises a second first fixing frame, a second second fixing frame and a second third fixing frame;

wherein the second first fixing frame and the second second fixing frame are both parallel to and above the second supporting plate, wherein the second first fixing frame and the second second fixing frame are connected with the second ram, and outward edges of the second first fixing frame and the second second fixing frame are both in a shape matching a shape of a side of the second through hole; and wherein the second third fixing frame penetrates through the second second fixing frame and intersects with the second supporting plate and the second first fixing frame, and is perpendicular to the second first fixing frame, the second second fixing frame and the second supporting plate.

7. The system according to claim 1, wherein the first double-drive screw transmission structure comprises:

a first saddle, a first first driving motor, a first second driving motor, a first first motor base, a first second motor base, a first first synchronous belt, a first second synchronous belt, a first lead screw, a first first driving wheel, a first second driving wheel, a first first driven wheel and a first second driven wheel;

the first lead screw is fixed on the first saddle via a first upper support and a first lower support, the first first motor base and the first second motor base are fixed on a top of the first saddle, the first first driving motor and the first second driving motor are respectively fixed on the first first motor base and the first second motor base, the first first driving wheel is connected with the first first driving motor, and the first second driving wheel is connected with the first second driving motor; and the first first driven wheel and the first second driven wheel are both connected with the first lead screw, the first first synchronous belt is connected with the first first driving wheel and the first first driven wheel, and the first second synchronous belt is connected with the first second driving wheel and the first second driven wheel.

8. The system according to claim 7, wherein an included angle between the first first synchronous belt and the first second synchronous belt is 60°-180°.

9. The system according to claim 8, wherein a distance between the first first driven wheel and the first second driven wheel is not greater than 50 mm.

10. The system according to claim 7, wherein the second double-drive screw transmission structure comprises:
 a second saddle, a second first driving motor, a second second driving motor, a second first motor base, a second second motor base, a second first synchronous belt, a second second synchronous belt, a second lead screw, a second first driving wheel, a second second driving wheel, a second first driven wheel and a second second driven wheel;
 the second lead screw is fixed on the second saddle via a second upper support and a second lower support, the second first motor base and the second second motor base are fixed on a top of the second saddle, the second first driving motor and the second second driving motor are respectively fixed on the second first motor base and the second second motor base, the second first driving wheel is connected with the second first driving motor, and
 the second second driving wheel is connected with the second second driving motor; and the second first driven wheel and the second second driven wheel are both connected with the second lead screw, the second first synchronous belt is connected with the second first driving wheel and the second first driven wheel, and the second second synchronous belt is connected with the second second driving wheel and the second second driven wheel.

11. The system according to claim 10, wherein an included angle between the second first synchronous belt and the second second synchronous belt is 60°-180°.

12. The system according to claim 11, wherein a distance between the second first driven wheel and the second second driven wheel is not greater than 50 mm.

* * * * *